Figure 1:
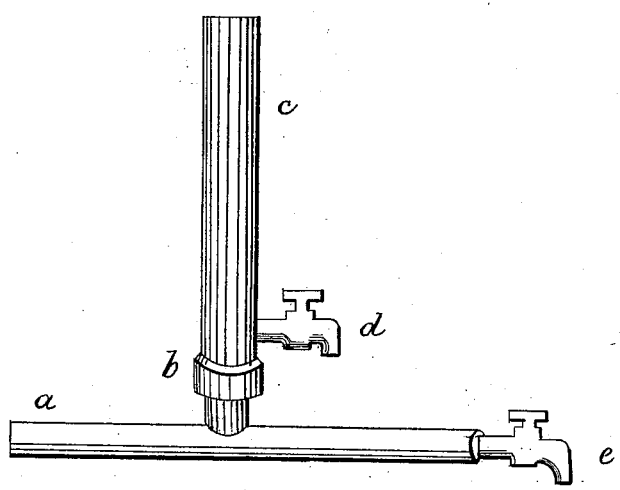

C. F. Baxter,
Water Filter,
N° 34,620. Patented Mar. 11, 1862.

Witnesses

Inventor
Chs. F. Baxter.

UNITED STATES PATENT OFFICE.

CHS. F. BAXTER, OF BOSTON, MASSACHUSETTS.

FILTER.

Specification of Letters Patent No. 34,620, dated March 11, 1862.

*To all whom it may concern:*

Be it known that I, CHS. F. BAXTER, of Boston, in the county of Suffolk and State of Massachusetts, have invented a new and useful improvement in filters used for water or other liquids by connecting an air-chamber to them in such a manner as to cause the elasticity of the air in the chamber by change of pressure to remove the collected impurities of filtration by the usual opening of the faucet; and I hereby declare that the following is a full and exact description.

Figure 1 represents water pipe $a$, filter $b$, air chamber $c$, faucets $d$, and $e$.

The water enters at $a$. All water drawn from faucet $d$, is filtered by passing through filtering medium $b$, leaving its impurities beneath. The faucets $d$, and $e$, being closed the pressure condenses the air in chamber $c$, filling it partly with water; and by opening faucet $e$,—which is for common use—the pressure is removed, the air refills chamber $c$, driving down water through filtering medium $b$, forcing the impurities into pipe $a$, and flows with the water out at $e$. This is repeated as often as the water is drawn at $e$.

I do not claim any special filter, air-chamber or faucet, in the adjustment; but—

I do claim as my improvement—

An air-chamber so connected with a filter or filtering medium as to remove the collected impurities of filtration, substantially as described.

CHS. F. BAXTER.

Witnesses:
ISAAC W. MARCHANT,
SAML. D. BAXTER.